United States Patent
Singh et al.

(10) Patent No.: US 6,526,764 B1
(45) Date of Patent: Mar. 4, 2003

(54) HYDROFLUOROCARBON REFRIGERANT COMPOSITIONS SOLUBLE IN LUBRICATING OIL

(75) Inventors: Rajiv Ratna Singh, Getzville, NY (US); David Paul Wilson, East Amherst, NY (US); Raymond Hilton Percival Thomas, Pendleton, NY (US); Robert Gerard Richard, Hamburg, NY (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 09/670,738

(22) Filed: Sep. 27, 2000

Related U.S. Application Data

(60) Provisional application No. 60/235,847, filed on Sep. 27, 2000.

(51) Int. Cl.$^7$ .................................. F25D 21/12
(52) U.S. Cl. ................... 62/84; 62/77; 62/114; 252/68; 252/67
(58) Field of Search ................ 62/114, 77, 84; 262/68, 67

(56) References Cited

U.S. PATENT DOCUMENTS

| | | | | |
|---|---|---|---|---|
| 5,470,497 A | * | 11/1995 | Schlosberg et al. | 252/68 |
| 5,494,597 A | * | 2/1996 | Krevalis, Jr. et al. | 252/68 |
| 5,531,080 A | * | 7/1996 | Hirahara et al. | 62/470 |
| 5,704,216 A | * | 1/1998 | Hirano et al. | 62/114 |
| 5,705,086 A | * | 1/1998 | Ardito et al. | 252/68 |
| 5,997,761 A | * | 12/1999 | Kaneko | 252/68 |
| 6,013,609 A | * | 1/2000 | Katafuchi | 508/206 |
| 6,080,705 A | * | 6/2000 | Kaimai et al. | 508/495 |
| 6,228,282 B1 | * | 5/2001 | Shimomura et al. | 252/68 |
| 6,231,782 B1 | * | 5/2001 | Shimomura et al. | 252/68 |
| 6,239,086 B1 | * | 5/2001 | Hirano et al. | 508/579 |

* cited by examiner

Primary Examiner—William Doerrler
Assistant Examiner—Mark Shulman
(74) Attorney, Agent, or Firm—Colleen D. Szuch

(57) ABSTRACT

Hydrofluorocarbon refrigerants are not soluble in hydrocarbon oil. Retrofitting refrigeration equipment with hydrofluorocarbons generally entails the use of expensive polyol ester (POE) lubricants. The invention provides hydrofluorocarbon refrigerant compositions that are soluble in hydrocarbon oil thus allowing for a simpler and less expensive retrofit option to the refrigerant user.

17 Claims, No Drawings

HYDROFLUOROCARBON REFRIGERANT COMPOSITIONS SOLUBLE IN LUBRICATING OIL

The present application claims priority of provisional application No. 60/235,847, filed on Sep. 27, 2000 with the United States Patent and Trademark Office, and U.S. application Ser. No. 09/670,738, filed on Sep. 27, 2000 (pending), both of which are incorporated herein by reference.

FIELD OF THE INVENTION

The invention relates generally to compositions for use as refrigerants, aerosol propellants, heat transfer media, gaseous dielectrics, fire-extinguishing agents, foam blowing agents and solvents. More particularly, the invention relates to hydrofluorocarbon refrigerant compositions that are soluble in lubricating oil.

BACKGROUND OF THE INVENTION

Fluorocarbon based fluids have found widespread use in industry for refrigeration, air conditioning and heat pump applications.

Vapor compression cycles are one common form of refrigeration. In its simplest form, the vapor compression cycle involves changing the refrigerant from the liquid to the vapor phase through heat absorption at a low pressure, and then from the vapor to the liquid phase through heat removal at an elevated pressure.

While the primary purpose of refrigeration is to remove energy at low temperature, the primary purpose of a heat pump is to add energy at higher temperature. Heat pumps are considered reverse cycle systems because for heating, the operation of the condenser is inter-changed with that of the refrigeration evaporator.

The art is continually seeking new fluorocarbon based fluids, which offer alternatives for refrigeration and heat pump applications. Currently, of particular interest, are fluorocarbon-based mixtures, which are considered to be environmentally acceptable substitutes for the presently used chlorofluorocarbons. The latter, such as monochlorodifluoromethane (R-22) are suspected of causing environmental problems in connection with the earth's protective ozone layer.

The substitute materials must also possess those properties unique to the chlorofluorocarbons including similar refrigeration characteristics, chemical stability, low toxicity, non-flammability, efficiency in-use and low temperature glides.

By "similar refrigeration characteristics" is meant a vapor pressure that is plus or minus 20 percent of the reference refrigerant at the same temperature.

The characteristic of efficiency in-use is important, for example, in air conditioning and refrigeration where a loss in refrigerant thermodynamic performance or energy efficiency may have secondary environmental impacts through increased fossil fuel usage arising from an increased demand for electrical energy.

Alternative hydrofluorocarbon refrigerants are known. R-507 is an azeotrope-like blend of pentafluoroethane (R-125) and 1,1,1-trifluoroethane (R-143a). R-404A is a non-azeotropic blend of R-125, R-143a and 1,1,1,2-tetrafluoroethane (R-134a). R-407 is a non-azeotropic blend of difluoromethane (R-32), R-125 and R-134a. These alternative refrigerants are available commercially from various sources including Honeywell, DuPont, Atochem and ICI.

R-407C serves as a non-ozone-depleting replacement for R-22 in various air-conditioning applications, as well as in most refrigeration systems including chillers. Since R-407C is a close match to R-22 it also serves as a retrofit fluid in applications where R-22 is generally used.

The widespread commercial use of chlorine-free hydrofluorocarbon refrigerants has been hindered, however, by the lack of commercially adequate lubricants. Mineral oil or alkyl benzenes, which have been used traditionally with R-22, are immiscible with R-407C and must therefore be replaced with expensive polyol ester lubricants. In retrofitting refrigerant systems with hydrofluorocarbon refrigerants it is necessary to drain as much of the oil as possible before adding the replacement lubricant. Often this entails removing the compressor from the system to drain lubricant. A chlorine-free R-22 retrofit fluid that is soluble in lubricating oils would advance the art.

SUMMARY OF THE INVENTION

The invention provides refrigerant compositions that are soluble in lubricating oils and are particularly useful as R-22 retrofit fluids.

The compositions of the invention comprise a refrigerant and a solubilizing agent. Preferably the refrigerant is a hydrofluorocarbon refrigerant. Optionally, the compositions of the invention further comprise a lubricating oil selected from the group consisting of mineral or hydrocarbon oil, alkyl benzene oil, white or paraffinic oil and mixtures thereof.

In one embodiment of the invention, there is provided a composition comprising a refrigerant selected from the group consisting of the compounds listed in Table 1 and mixtures thereof and at least one solubilizing agent selected from the group consisting of the compounds listed in Table 2 and mixtures thereof.

In another embodiment, there is provided a composition comprising (i) from about 80 to about 99.9 weight percent, preferably from about 90 to about 99.9 weight percent, of a refrigerant selected from the compounds listed in Table 1 and mixtures thereof; and (ii) from about 20 to about 0.1 weight percent, preferably from about 10 to about 0.1 weight percent, of a solubilizing agent selected from the compounds listed in Table II and mixtures thereof.

In yet another embodiment of the invention, there is provided a composition comprising (i) from about 80 to about 99.9 weight percent, preferably from about 90 to about 99.9 weight percent, of a refrigerant selected from Table III; and (ii) from about 20 to about 0.1 weight percent, preferably from about 10 to about 0.1 weight percent, of a solubilizing agent selected from the compounds listed in Table II and mixtures thereof.

In still another preferred embodiment, there is provided a composition comprising (i) from about 80 to about 99.9 weight percent, preferably from about 90 to about 99.9 weight percent, of a refrigerant selected from Table IV; and (ii) from about 20 to about 0.1 weight percent, preferably from about 10 to about 0.1 weight percent, of a solubilizing agent selected from the compounds listed in Table II and mixtures thereof.

In a particularly preferred embodiment, there is provided a composition comprising (i) from about 80 to about 99.9 weight percent, preferably from about 90 to about 99.9 weight percent, of a refrigerant selected from the group consisting of R-407C, R-410A, R-404A and R-507A; and (ii) from about 20 to about 0.1 weight percent, preferably from about 10 to about 0.1 weight percent, of a solubilizing agent selected from the group consisting of butane, isobutane, pentane, dimethyl ether, and mixtures thereof.

When a lubricating oil is present, it is present in an amount of from about 1 to about 60 weight percent, preferably from about 10 to about 50 weight percent, based on the total composition.

In a process embodiment, there is provided a method for producing refrigeration which comprises condensing a composition of the invention and thereafter evaporating the composition in the vicinity of a body to be cooled.

In another process embodiment, there is provided a method for producing heating which comprises condensing a composition of the invention in the vicinity of a body to be heated and thereafter evaporating the composition.

DETAILED DESCRIPTION OF THE INVENTION AND PREFERRED EMBODIMENTS

The refrigerant may comprise any one of the compounds listed in Table I or mixtures thereof. Hydrofluorocarbon refrigerants are preferred. The term hydrofluorocarbon refers to compounds composed solely of carbon, hydrogen and fluorine atoms. Of the hydrofluorocarbon refrigerants listed in Table I, R-32, R-143a, R-125, R-134a and mixtures thereof are preferred.

Refrigerant mixtures are preferred. Representative refrigerant mixtures are listed in Table III. Hydrofluorocarbon refrigerant mixtures are preferred. Of the hydrofluorocarbon refrigerant mixtures listed in Table III, R-404A, R-407C, R-410A and R-507A are preferred. Hydrofluorocarbon refrigerant mixtures selected from Table IV are also preferred.

As used herein, the term solubilizing agent refers to a compound that increases the solubility of a hydrofluorocarbon refrigerant and a lubricating oil in one another. It will be understood that the solubilizing agent may comprise any one of the compounds listed in Table II or mixtures thereof. Butane, isobutane, pentane and dimethyl ether are preferred. The amount of solubilizing agent is an amount effective to dissolve a sufficient amount of refrigerant in the lubricating oil such that the diluted oil can be transported back to the refrigeration compressor. Typically, the solubilizing agent is present in an amount of from about 0.1 to about 20 weight percent, preferably from about 0.1 to about 10 weight percent, based on the total composition.

As used herein, the term lubricating oil refers to mineral or hydrocarbon oil; alkyl benzene oil; white or paraffinic oil; and mixtures thereof.. Suitable lubricating oils are commercially available from various sources (e.g., Capella brand names from Texaco and Suniso brand names from Sun Oil). The chemical compositions and uses of these oils are discussed in detail in the book "Fluorocarbon Refrigerants Handbook" by Ralph C. Downing, Prentice Hall, 1998, pp. 206–270. The amount of lubricating oil is an amount effective to provide acceptable lubrication to the compressor parts for its longevity. An effective amount of lubricating oil is the amount recommended by the equipment manufacturer. Typically, the lubricating oil is present in an amount of from about 1 to about 60 weight percent, preferably from about 10 to about 50 based on the total composition.

TABLE I

Refrigerants

| Refrigerant Number | Chemical Name | Chemical Formula |
|---|---|---|
| Methane Series | | |
| 11 | Trichlorofluoromethane | $CCl_3F$ |
| 12 | Dichlorodifluoromethane | $CCl_2F_2$ |
| 13 | Chlorotrifluoromethane | $CClF_3$ |
| 14 | Tetrafluoromethane (carbon tetrafluoride) | $CF_4$ |
| 21 | Dichlorofluoromethane | $CHCl_2F$ |
| 22 | Chlorodifluoromethane | $CHClF_2$ |
| 23 | Trifluoromethane | $CHF_3$ |
| 30 | Dichloromethane (methylene chloride) | $CH_2Cl_2$ |
| 31 | Chlorofluoromethane | $CH_2ClF$ |
| 32 | Difluoromethane (methylene fluoride) | $CH_2F_2$ |
| 40 | Chloromethane (methylene fluoride) | $CH_2F_2$ |
| 41 | Fluoromethane (methyl fluoride) | $CH_3F$ |
| Ethane Series | | |
| 113 | 1,1,2-trichloro-1,2,2-trifluoroethane | $CCl_2FCClF_2$ |
| 114 | 1,2-dichloro-1,1,2,2-tetrafluoromethane | $CClF_2CClF_2$ |
| 115 | Chloropentafluoroethane | $CClF_2CF_3$ |
| 116 | Hexafluoroethane | $CF_3CF_3$ |
| 123 | 2,2-dichloro-1,1,1,-trifluoroethane | $CHCl_2CF_3$ |
| 124 | 1-chloro-1,1,1,2-tetrafluoroethane | $CHClFCF_3$ |
| 125 | Pentafluoroethane | $CHF_2CF_3$ |
| 134a | 1,1,1,2-tetrafluoroethane | $CH_2FCF_3$ |
| 141b | 1,1-dichloro-1-fluoroethane | $CH_3CCl_2F$ |
| 142b | 1-chloro-1,1-difluoroethane | $CH_3CClF_2$ |
| 143a | 1,1,1-trifluoroethane | $CH_3CF_3$ |
| 152a | 1,1-difluoroethane | $CH_3CHF_2$ |
| Propane Series | | |
| 218 | Octafluoropropane | $CF_3CF_2CF_3$ |
| 227ea | 1,1,1,2,3,3,3-heptafluoropropane | $CF_3CHFCF_3$ |
| 236fa | 1,1,1,3,3,3-hexafluoropropane | $CF_3CH_2CF_3$ |
| 245fa | 1,1,1-3,3-pentafluoropropane | $CF_3CH_2CHF_2$ |
| Butane Series | | |
| 365 | 1,1,1,3,3-pentafluorobutane | $CF_3CH_2CF_2CH_3$ |
| Cyclic Organic Compounds | | |
| C318 | Octafluorocyclobutane | $-(CF_2)_4-$ |

TABLE II

Solubilizing Agents

| Refrigerant Number | Chemical Name | Chemical Formula |
|---|---|---|
| Miscellaneous Organic Compounds Hydrocarbons | | |
| 30 | Dichloromethane (methylene chloride) | $CH_2Cl_2$ |
| 40 | Chloromethane (methyl chloride) | $CH_3Cl$ |
| 50 | Methane | $CH_4$ |
| 170 | Ethane | $CH_3CH_3$ |
| 290 | Propane | $CH_3CH_2CH_3$ |
| 600 | Butane | $CH_3CH_2CH_2CH_3$ |
| 600a | Isobutane | $CH(CH_3)_2CH_3$ |
| — | Pentane | $CH_3(CH_2)3CH_3$ |
| — | Isopentane | $CH_3CH(CH_3)CH_2CH_3$ |
| — | Neopentane | $CH_3C(CH_3)_2CH_3$ |
| — | Cyclopentane | $-(CH_2)_5-$ |
| Fluorocarbons | | |
| 1311 | Iodotrifluoromethane | $CF_3I$ |
| — | Pentafluorodimethyl ether | $CF_2OCF_2H$ |
| 152a | 1,1-difluoroethane | $CH_3CHF_2$ |

TABLE II-continued

Solubilizing Agents

| Refrigerant Number | Chemical Name | Chemical Formula |
|---|---|---|
| 161 | Fluoroethane | $CH_3CH_2F$ |
| 218 | Hexafluoroethane | $CF_3CF_3$ |
| | Oxygen compounds | |
| — | Dimethyl ether | $CH_3OCH_3$ |
| 610 | Ethyl ether | $CH_3CH_2OCH_2CH_3$ |
| — | Poly butylene glycols | $H\text{-}(O\text{-}CH_3CH_2CH_2CH_3)_n\text{-}OH$ |
| 611 | Methyl formate | $HCOOCH_3$ |
| | Inorganic Compounds | |
| 744 | Carbon dioxide | $CO_2$ |
| 764 | Sulfur hexafluoride | $SF_6$ |
| | Unsaturated Organic Compounds | |
| 1150 | Ethene (ethylene) | $CH_2{=}CH_2$ |
| 1270 | Propene (propylene) | $CH_3CH{=}CH_2$ |

TABLE III

Refrigerant Mixtures

| Refrigerant Number | Composition (Wt. %) |
|---|---|
| | Zeotropes |
| 400 | R-12/114 (40/60) |
| 401A | R-22/152a/124 (53/13/34) |
| 401B | R-22/152a/124 (61/11/28) |
| 401C | R-22/152a/124 (33/15/52) |
| 402A | R-125/290/22 (60/2/38) |
| 402B | R-125/290/22 (38/2/60) |
| 403A | R-290/22/218 (5/75/20) |
| 403B | R-290/22/218 (5/56/39) |
| 404A | R-125/143a/134a (44/52/4) |
| 405A | R-22/152a/142b/C318 (45/7/5.5/42.5) |
| 406A | R-22/600a/142b (55/4/41) |
| 407A | R-32/125/134a (20/40/40) |
| 407B | R-32/125/134a (10/70/20) |
| 407C | R-32/125/134a (23/25/52) |
| 407D | R-32/125/134a (15/15/70) |
| 407E | R-32/125/134a (25/15/60) |
| 408A | R-125/143a/22 (7/46/47) |
| 409A | R-22/124/142b (60/25/15) |
| 409B | R-22/124/142b (65/25/10) |
| 410A | R-32/125 (50/50) |
| 410B | R-32/125 (45/55) |
| 411A | R-1270/22/152a) (1.5/87.5/11.0) |
| 411B | R-1270/22/152a (3/94/3) |
| 412A | R-22/218/143b (70/5/25) |
| 413A | R-218/134a/600a (9/88/3) |
| 414A | R-22/124/600a/142b (51/28.5/4/16.5) |
| 414B | R-22/124/600a/142b (50/39/1.5/9.5) |
| | Azeotropes |
| 500 | R-12/152a (73.8/26.2) |
| 501 | R-22/12 (75.0/25.0) |
| 502 | R-22/115 (48.8/51.2) |
| 503 | R-23/13 (40.1/59.9) |
| 504 | R-32/115 (48.2/51.8) |
| 505 | R-12/31 (78.0/22.0) |
| 506 | R-31/114 (55.1/44.9) |
| 507A | R-125/143a (50/50) |
| 508A | R-23/116 (39/61) |
| 508B | R-23/116 (46/54) |
| 509A | R-22/218 (44/56) |

TABLE IV

Hydrofluorocarbon Refrigerant Mixtures

| Mixture # | R-32 wt. % | R-125 wt. % | R-143a wt. % | R-134a wt. % |
|---|---|---|---|---|
| 1 | 10 to 80 | 90 to 20 | — | — |
| 2 | 5 to 45 | 5 to 45 | — | 90 to 10 |
| 3 | — | 30 to 90 | 70 to 10 | — |
| 4 | — | 60 to 40 | 39 to 20 | 2 to 40 |

The components of the composition of the invention are known materials that are commercially available or may be prepared by known methods. Preferably, the components are of sufficiently high purity so as to avoid the introduction of adverse influences on the properties of the system.

The compositions of the invention may also contain additives such as oxidation resistance and thermal stability enhancers, corrosion inhibitors, metal deactivators, lubricity additives, viscosity index enhancers, pour and/or floc point depressants, detergents, dispersants, antifoaming agents, anti-wear agents, and extreme pressure resistant additives. Many additives are multifunctional. For example, certain additives may impart both anti-wear and extreme pressure resistance properties, or function both as a metal deactivator and a corrosion inhibitor. Cumulatively, all additives preferably do not exceed 8% by weight, or more preferably do not exceed 5% by weight, of the total composition.

An effective amount of the foregoing additive types is generally in the range from 0.01 to 5% for the antioxidant component, 0.01 to 5% for the corrosion inhibitor component, from 0.001 to 0.5% for the metal deactivator component, from 0.5 to 5% for the lubricity additives, from 0.01 to 2% for each of the viscosity index enhancers and pour and/or floc point depressants, from 0.1 to 5% for each of the detergents and dispersants, from 0.001 to 0.1% for anti-foam agents, and from 0.1–2% for each of the anti-wear and extreme pressure resistance components. All these percentages are by weight and are based on the total composition. It is to be understood that more or less than the stated amounts of additives may be more suitable to particular circumstances, and that a single molecular type or a mixture of types may be used for each type of additive component. Also, the examples listed below are intended to be merely illustrative and not limiting.

Examples of suitable oxidation resistance and thermal stability enhancers are diphenyl-, dinaphthyl-, and phenylnaphthyl-amines, in which the phenyl and naphthyl groups can be substituted, e.g., N,N'-diphenyl phenylenediamine, p-octyldiphenylamine, p,p-dioctyldiphenylamine, N-phenyl-1-naphthyl amine, N-phenyl-2-naphthyl amine, N-(p-dodecyl)phenyl-2-naphthyl amine, di-1-naphthylamine, and di-2-naphthylamine; phenothazines such as N-alkylphenothiazines; imino(bisbenzyl); and hindered phenols such as 6-(t-butyl)phenol, 2,6-di-(t-butyl)phenol, 4-methyl-2,6-di-(t-butyl)phenol, 4,4'-methylenebis(2,6-di-{t-butyl}phenol), and the like.

Examples of suitable cuprous metal deactivators are imidazole, benzamidazole, 2-mercaptobenzthiazole, 2,5-dimercaptothiadiazole, salicylidinepropylenediamine, pyrazole, benzotriazole, tolutriazole, 2-methylbenzamidazole, 3,5-imethyl pyrazole, and methylene bis-benzotriazole. Benzotriazole derivatives are preferred. Other examples of more general metal deactivators and/or corrosion inhibitors include organic acids and their esters, metal salts, and anhydrides, e.g., N-oleyl-sarcosine, sorbitan mono-oleate, lead naphthenate, dodecenyl-succinic acid and its partial esters and amides, and 4-nonylphenoxy acetic acid; primary, secondary, and tertiary aliphatic and cycloaliphatic amines and amine salts of organic and inorganic acids, e.g., oil-soluble alkylammonium carboxylates; heterocyclic nitrogen containing compounds, e.g., thiadiazoles, substituted imidazolines, and oxazolines; quinolines, quinones, and anthraquinones; propyl gallate; barium dinonyl naphthalene sulfonate; ester and amide derivatives of alkenyl succinic anhydrides or acids, dithiocarbamates, dithiophosphates; amine salts of alkyl acid phosphates and their derivatives.

Examples of suitable lubricity additives include long chain derivatives of fatty acids and natural oils, such as esters, amines, amides, imidazolines, and borates.

Examples of suitable viscosity index enhancers include polymethacrylates, copolymers of vinyl pyrrolidone and methacrylates, polybutenes, and styrene-acrylate copolymers.

Examples of suitable pour point and/or floc point depressants include polymethacrylates such as methacrylate-ethylene-vinyl acetate terpolymers; alkylated naphthalene derivatives; and products of Friedel-Crafts catalyzed condensation of urea with naphthalene or phenols.

Examples of suitable detergents and/or dispersants include polybutenylsuccinic acid amides; polybutenyl phosphonic acid derivatives; long chain alkyl substituted aromatic sulfonic acids and their salts; and metal salts of alkyl sulfides, of alkyl phenols, and of condensation products of alkyl phenols and aldehydes.

Examples of suitable anti-foam agents include silicone polymers and some acrylates.

The present invention further provides for methods of recharging refrigeration systems of the type containing a chlorine-containing refrigerant and a lubricating oil using the compositions of the present invention. In certain embodiments, the methods of the present invention comprise (a) removing the chlorine-containing refrigerant from a refrigeration system containing a chlorine-containing refrigerant while leaving substantially all of the lubricating oil in the system; and (b) introducing to the lubricating oil left in the system a composition of the present invention. In light of the disclosure herein, those of skill in the art will be readily able to practice the methods of the present invention without undue experimentation.

Examples of suitable anti-wear and extreme pressure resistance agents include sulfurized fatty acids and fatty acid esters, such as sulfurized octyl tallate; sulfurized terpenes; sulfurized olefins; organopolysulfides; organo phosphorus derivatives including amine phosphates, alkyl acid phosphates, dialkyl phosphates, aminedithiophosphates, trialkyl and triaryl phosphorothionates, trialkyl and triaryl phosphines, and dialkylphosphites, e.g., amine salts of phosphoric acid monohexyl ester, amine salts of dinonylnaphthalene sulfonate, triphenyl phosphate, trinaphthyl phosphate, diphenyl cresyl and dicresyl phenyl phosphates, naphthyl diphenyl phosphate, triphenylphosphorothionate; dithiocarbamates, such as an antimony dialkyl dithiocarbamate; chlorinated and/or fluorinated hydrocarbons, and xanthates.

EXAMPLES

Example 1

Critical flammability ratio (CFR) of mixtures determined using Underwriter Laboratories Refrigerant Flammability test method 2182. CFR allows determination of what level of flammable material can be incorporated, without the mixture itself becoming flammable. Butane and dimethyl ether (DME) were added to R-407C (23 wt. % R-32; 25 wt. % R-125 and 52 wt. % R-134a) as the flammable additive.

| Temp. (° C.) | Additive | Wt. % |
|---|---|---|
| 25 | Butane | 3.4 |
| 60 | Butane | 3.1 |
| 100 | Butane | 2.5 |
| 25 | DME | 3.3 |
| 60 | DME | 2.7 |
| 100 | DME | 2.1 |

The table indicates that certain 32/125/134a/butane (or DME) compositions are nonflammable per the widely used refrigerant flammability method.

Example 2

Actual testing in a refrigeration machine of a composition of the invention (test mixture: 22.5 wt. % R-32, 24.5 wt. % R-125, 51 wt. % R-134a, 2 wt. % butane) was performed under typical air conditioning conditions and using mineral oil supplied by the compressor manufacturer (Copeland blended white oil Catalog No. 999-5170-31).

Testing was performed in a 2 ton air conditioner system setup similar to the unit reported in Report DOE/CE/23810-71 "Study of Lubricant Circulation in HVAC Systems," March 1995–April 1996 (author Frank R. Biancardi et. al.; prepared for Air Conditioning and Refrigeration Technology Institute Under ARTI/MCLR Project No. 665-53100) except that instead of equal size risers, three different size risers (¾", ⅞" and 1⅛") were used to allow a greater variety of velocities. Also the ability to pump oil from the compressor sump into the compressor discharge line was added. Using a hand pump, 90 cc of oil from the sump was injected into the compressor discharge line. By observing the oil level in the compressor sump versus time, the rate and time required for oil return was measured.

| Composition | Capacity (tons) | COP | Oil return rate (cc/min) | Completion Time (min) |
|---|---|---|---|---|
| R-407C | 1.70 | 2.9 | 2.4 | 65 |
| Test Mixture | 1.88 | 3.3 | 2.7 | 46 |

Oil return is important for compressor reliability purposes. The example demonstrates that both capacity and efficiency of the system are enhanced over R-407C in the absence of the solubilizing agent and the oil return is improved as well (in mineral oil systems).

Examples 3–7

The performance of mixtures of HFC refrigerant R-407C is obtained in the presence and absence of solublizing agents in a thermodynamic refrigeration cycle operating in typical air conditioning application (100° F. condensing temperature and 40° F. evaporating temperature). The vapor pressure of each mixture is measured at 25° C.

| Ex. No. | 32/125/134a Refrigerant Mixture (wt. %) | Solubi- lizing agent | Wt. % | Refrigera- tion Capacity relative to R-407C | Vapor Pressure relative to R-407C (25 °C.) | Oil Re- turn |
|---|---|---|---|---|---|---|
| 3 | 23/25/52 (R-407C) | — | 0 | 1 | 1 | No |
| 4 | 21.9/23.8/49.3 | Propane | 5 | 1.05 | 1.05 | Yes |
| 5 | 21.9/23.8/49.3 | Butane | 5 | 1.00 | 0.99 | Yes |
| 6 | 22.6/24.5/51.0 | Butane | 2 | 1.00 | 1.00 | Yes |
| 7 | 20.9/22.7/47.4 | Butane | 10 | 1.00 | 0.98 | Yes |

Example 3 demonstrates that the HFC itself is unsuitable for use with hyrocarbon oil in that without oil return the compressor may be damaged.

Example 4 demonstrates that although there is oil return, the addition of propane results in an undesirable increase in the pressure of the system.

Examples 5–7 demonstrate that the use of butane results in oil return without an undesirable pressure increase. This is particularly important for retrofitting applications.

What is claimed is:

1. A composition comprising from about 80 to about 99.9 weight percent of a hydrofluorocarbon refrigerant and from about 20 to about 0.1 weight percent of a solubilizing agent selected from the group consisting of butane, isobutane, pentane, dimethyl ether and mixtures thereof.

2. The composition of claim 1 wherein the hydrofluorocarbon refrigerant comprises a compound selected from the group consisting of R-32, R-125, R-134a, R-143a and mixtures thereof.

3. The composition of claim 1 wherein the hydrofluorocarbon refrigerant is a mixture of R-32, R-125 and R-134a.

4. The composition of claim 1 wherein the hydrofluorocarbon refrigerant is a mixture of R-32 and R-125.

5. The composition of claim 1 wherein the hydrofluorocarbon refrigerant is a mixture of R-143a, R-125 and R-134a.

6. The composition of claim 1 wherein the hydrofluorocarbon refrigerant is a mixture of R-125 and R-143a.

7. The composition of claim 1 wherein the hydrofluorocarbon refrigerant is selected from the group consisting of the compositions listed in Table III.

8. The composition of claim 1 wherein the hydrofluorocarbon refrigerant is selected from the group consisting of R-404A, R-407C, R-410A and R-507A.

9. The composition of claim 1 wherein the hydrofluorocarbon refrigerant is selected from the group consisting of the compositions listed in Table IV.

10. The composition of any one of claims 1–9 wherein the solubilizing agent is butane.

11. The composition of any one of claims 1–9 wherein the solubilizing agent is isobutane.

12. The composition of any one of claims 1–9 wherein the solubilizing agent is pentane.

13. The composition of any one of claims 1–9 wherein the solubilizing agent is dimethyl ether.

14. The composition of claim 1 further comprising a lubricating oil selected from the group consisting of mineral or hydrocarbon oil, alkyl benzene oil, white or paraffinic oil and mixtures thereof.

15. A method for producing refrigeration which comprises condensing the composition of claim 1 and thereafter evaporating the composition in the vicinity of a body to be cooled.

16. A method for producing heating which comprises condensing the composition of claim 1 in the vicinity of a body to be heated and thereafter evaporating the composition.

17. A method of recharging a refrigeration system of the type containing a chlorine-containing refrigerant and a lubricating oil, comprising:
   (a) removing said chlorine-containing refrigerant from said refrigeration system while leaving substantially all of said lubricating oil in said system; and
   (b) introducing to said lubricating oil left in said system a composition comprising:
      (i) a hydrofluorocarbon refrigerant; and
      (ii) a solubilizing agent selected from the group consisting of butane, isobutane, pentane, dimethyl ether and mixtures thereof.

* * * * *